United States Patent
Nou

(10) Patent No.: US 7,365,641 B2
(45) Date of Patent: Apr. 29, 2008

(54) VEHICLE PROXIMITY ALERTING SYSTEM AND METHOD

(75) Inventor: Seong Taeg Nou, Icheon-shi (KR)

(73) Assignee: Hyundai Autonet Co., Ltd., Icheon-Shi, Kyungki-Do (KR)

( * ) Notice: Subject to any disclaimer, the term of this patent is extended or adjusted under 35 U.S.C. 154(b) by 259 days.

(21) Appl. No.: 11/162,758

(22) Filed: Sep. 21, 2005

(65) Prior Publication Data

US 2006/0164222 A1    Jul. 27, 2006

(51) Int. Cl.
- B60Q 1/00    (2006.01)
- G08G 1/14    (2006.01)
- G08G 1/16    (2006.01)
- H04N 7/18    (2006.01)
- H04N 9/47    (2006.01)
- G05D 1/02    (2006.01)

(52) U.S. Cl. ............ 340/436; 340/435; 340/438; 340/903; 340/932.2; 348/143; 348/144; 348/145; 348/146; 348/147; 348/148; 701/300; 701/301; 701/302

(58) Field of Classification Search ........... 340/425.5, 340/435–436, 903, 932.2, 438; 701/45–49, 701/300–302; 342/70; 348/143–148
See application file for complete search history.

(56) References Cited

U.S. PATENT DOCUMENTS

| | | | | |
|---|---|---|---|---|
| 5,529,139 A | * | 6/1996 | Kurahashi et al. | 180/169 |
| 5,572,484 A | * | 11/1996 | Gaus et al. | 367/99 |
| 5,574,426 A | * | 11/1996 | Shisgal et al. | 340/435 |
| 5,754,123 A | * | 5/1998 | Nashif et al. | 340/903 |
| 6,097,285 A | * | 8/2000 | Curtin | 340/436 |
| 6,211,778 B1 | * | 4/2001 | Reeves | 340/436 |
| 6,225,918 B1 | * | 5/2001 | Kam | 340/903 |
| 6,326,887 B1 | * | 12/2001 | Winner et al. | 340/435 |
| 6,339,369 B1 | * | 1/2002 | Paranjpe | 340/436 |
| 6,534,884 B2 | * | 3/2003 | Marcus et al. | 307/10.1 |
| 6,606,027 B1 | * | 8/2003 | Reeves et al. | 340/436 |
| 6,734,807 B2 | * | 5/2004 | King | 340/903 |
| 6,853,311 B2 | * | 2/2005 | Taniguchi | 340/903 |
| 6,867,692 B2 | * | 3/2005 | Weatherspoon | 340/479 |
| 6,879,248 B2 | * | 4/2005 | Flick | 340/435 |
| 6,894,608 B1 | * | 5/2005 | Gunderson | 340/468 |
| 6,914,521 B2 | * | 7/2005 | Rothkop | 340/425.5 |

(Continued)

FOREIGN PATENT DOCUMENTS

KR    1020040035290    4/2004

(Continued)

Primary Examiner—Benjamin C. Lee
Assistant Examiner—Lam Pham
(74) Attorney, Agent, or Firm—IPLA P.A.; James E. Bame

(57) ABSTRACT

A vehicle proximity alerting system and method is provided. The system includes: a sensor unit having a plurality of sensors for measuring distances from other vehicles; a system controlling unit for receiving measurement signals from the sensors, calculating distances from other vehicles, determining whether or not the calculated distance is less than a preset vehicle proximity distance setting value, and generating an alert signal when it is determined that the calculated distance is less than the vehicle proximity distance setting value; and an alerting unit for receiving the alert signal and alerting.

9 Claims, 4 Drawing Sheets

U.S. PATENT DOCUMENTS

| | | | |
|---|---|---|---|
| 7,049,945 B2* | 5/2006 | Breed et al. | 340/435 |
| 7,095,361 B2* | 8/2006 | Mattes et al. | 342/70 |
| 7,123,168 B2* | 10/2006 | Schofield | 340/937 |
| 7,176,789 B2* | 2/2007 | Herder | 340/435 |
| 2005/0122234 A1* | 6/2005 | Danz et al. | 340/932.2 |

FOREIGN PATENT DOCUMENTS

| | | |
|---|---|---|
| KR | 1020040035295 | 4/2004 |
| KR | 1020040035297 | 4/2004 |
| KR | 1020040033101 | 10/2004 |

* cited by examiner

VEHICLE PROXIMITY ALERTING SYSTEM AND METHOD

BACKGROUND OF THE INVENTION

1. Field of the Invention

The present invention relates to a vehicle safety system, and more particularly, to a vehicle proximity alerting system and method for measuring distances from other vehicles in driving, and alerting when the other vehicles approach within a predetermined distance.

2. Description of the Related Art

At present, a penetration rate of car is being continuously increased. As the penetration rate is increased, there are occurring large or small traffic accidents. In order to prevent the traffic accidents, various devices are being developed and installed at the car.

As one example of the devices, there is a rear object sensing device for sensing an object or a man lying in rear of a vehicle in parking or backing, informing a distance from the object or the man, and alerting a driver when the object or the man is within a predetermined distance, thereby preventing a collision or personal accident. It is a current trend that installs the rear object sensing device at the vehicle. When a vehicle is driven at a low speed, that is, when the vehicle is put into reverse, its rear object sensing device alerts the driver for the object lying within a limited distance.

As described above, as the penetration rate is continuously increased, it is required to develop devices for preventing the traffic accidents.

In addition to the rear object sensing device for preventing a relatively small traffic accident, such as collision with the rear object and man, only in one direction at limited distance and speed, various supplementary devices for preventing a fender-bender and a large traffic accident even in driving are being required.

SUMMARY OF THE INVENTION

Accordingly, the present invention is directed to a vehicle proximity alerting system and method that substantially overcomes one or more of the limitations and disadvantages of the conventional art.

One object of the present invention is to provide a vehicle proximity alerting system and method for alerting a driver when other vehicles approach within a predetermined distance from a driver's vehicle running even at a high speed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a vehicle proximity alerting system including: a sensor unit having a plurality of sensors for measuring distances from other vehicles; a system controlling unit for receiving measurement signals from the sensors, calculating distances from other vehicles, determining whether or not the calculated distance is less than a preset vehicle proximity distance setting value, and generating an alert signal when it is determined that the calculated distance is less than the vehicle proximity distance setting value; and an alerting unit for receiving the alert signal and alerting.

In another aspect of the present invention, there is provided a vehicle proximity alerting method including the steps of: setting at least one proximity distance setting value by a user; measuring distances from other vehicles; and sequentially comparing the measured distances with the proximity distance setting values, and alerting correspondingly to the corresponding proximity distance setting value.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
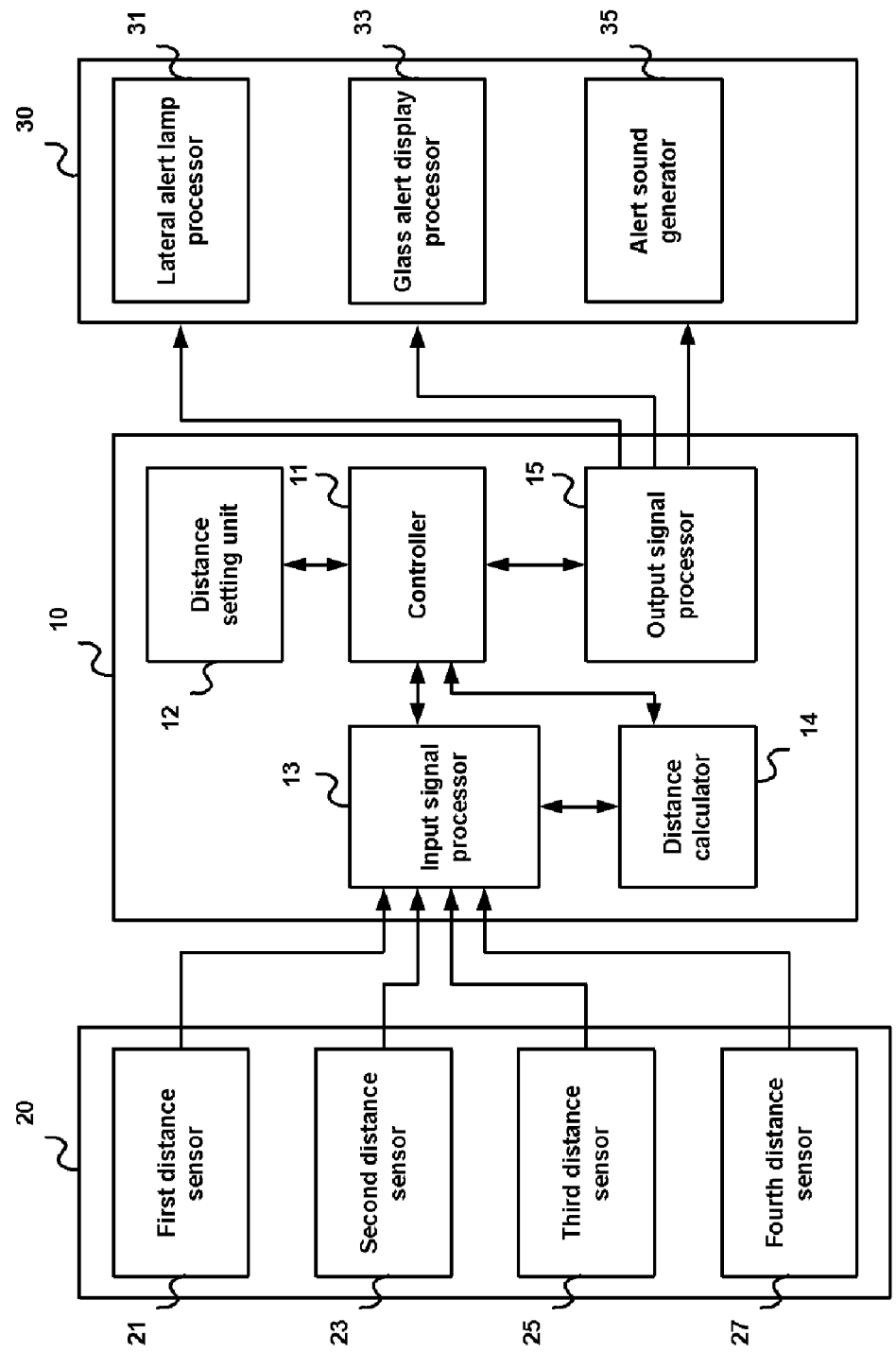
FIG. 1 illustrates a construction of a vehicle proximity alerting system according to an embodiment of the present invention.

Reference will now be made in detail to the preferred embodiments of the present invention, examples of which are illustrated in the accompanying drawings. Wherever possible, the same reference numerals will be used throughout the drawings to refer to the same or like parts.

Figure 3:
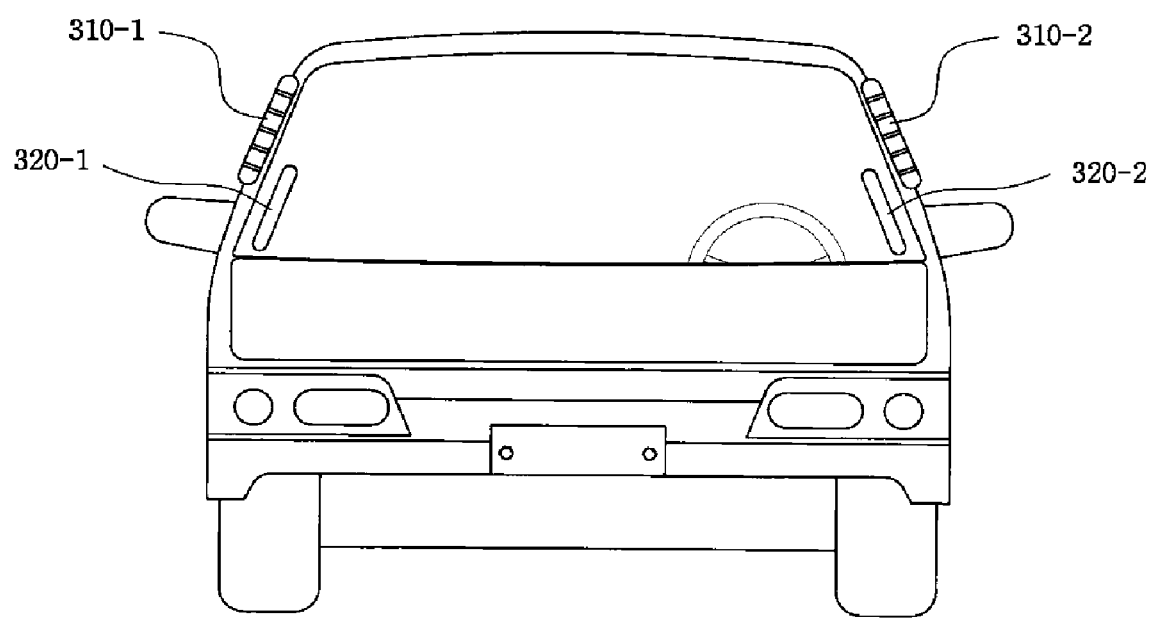
FIG. 3 is a conceptive view illustrating an example of an alerting unit installed at a vehicle according to an embodiment of the present invention.
Figure 4:
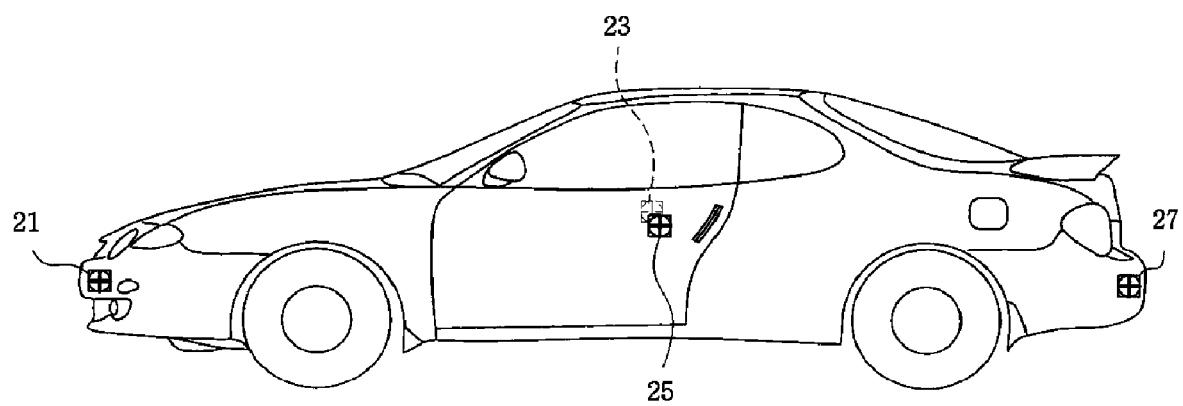
FIG. 4 illustrates an example of installing a distance measurement sensor according to an embodiment of the present invention.

FIG. 1 illustrates a construction of a vehicle proximity alerting system according to an embodiment of the present invention, FIG. 3 is a conceptive view illustrating an example of an alerting unit installed at a vehicle according to an embodiment of the present invention, and FIG. 4 illustrates an example of installing a distance measurement sensor according to an embodiment of the present invention. Hereinafter, a description will be made with reference to FIG. 1 and FIGS. 3 and 4.

The inventive vehicle proximity alerting system includes a sensor unit 20, a system controlling unit 10, and the alerting unit 30.

The sensor unit 20 is installed around a vehicle, and senses distances from other vehicles approaching around the vehicle, generates a sensing signal based on the distance, and outputs the generated sensing signal to the system controlling unit 10.

In the present invention, as shown in FIG. 4, the sensor unit 20 includes a first distance sensor 21 for measuring a distance from a front vehicle; a second distance sensor 23 for measuring a distance from an approaching right vehicle; a third distance sensor 25 for measuring a distance from an approaching left vehicle; and a fourth distance sensor 27 for measuring a distance from an approaching rear vehicle. The present invention measures the distances from the vehicles approaching only in four directions, but can further include four sensors installed in diagonal directions of the vehicle and measure the distances from the vehicles approaching even in eight directions including the diagonal directions. Each sensor generates the sensing signal based on the distance, and outputs the generated sensing signal to the system controlling unit 10.

The system controlling unit 10 includes a controller 11, a distance setting unit 12, an input signal processor 13, a distance calculator 13, and an output signal processor 15.

The controller 11 includes a storage region for temporarily storing a control program for alerting other vehicles' proximity, and data generated in execution of the control program. The controller 11 controls a general operation of the vehicle proximity alerting system according to the present invention.

The distance setting unit 12 stores at least one proximity distance setting value, which is set by a user. The proximity distance setting value can be inputted by the user through a key input unit (not shown), and can be set in plural. For example, the user, that is, the driver can set at least one proximity distance setting value, such as three meters set as a first proximity distance setting value, one meter set as a second proximity distance setting value, and fifty centimeters set as a third proximity distance setting value.

The input signal processor 13 converts the sensing signals respectively inputted from the sensors, into distance values.

The distance calculator 14 receives and sequentially compares the measured distance values and at least one proximity distance setting value, which is preset through the controller 11, and determines whether or not the measured distance value is less than the proximity distance setting value. For example, assuming that a front measurement distance value, that is, the distance value measured in the first distance sensor is one and half meters, the distance calculator 14 compares the measured distance value of one and half meters with the first proximity distance setting value of three meters, and determines that the measured distance value is less than the first proximity distance setting value of three meters and is more than the second proximity distance setting value of one meter. Accordingly, a comparison with the third proximity distance setting value of half meter is not performed. Upon completion of the comparison, the distance calculator 14 outputs a determination result to the controller 11. At this time, the controller 11 controls the output signal processor 15 based on the determination result.

The output signal processor 15 generates an alert signal under the control of the controller 11. The alert signal is different depending on the control of the controller 11. Further, the alert signal can be a lamp blink signal, text data, or an alert sound generating signal depending on a construction of the alerting unit 30.

Upon reception of the alert signal, the alerting unit 30 alerts vehicle proximity to the driver and other vehicles' drivers.

The alerting unit 30 includes a lateral alert lamp processor 31 installed at front or rear lateral frames of the vehicle such as reference numerals 310-1 and 310-2 denoted in FIG. 3; a glass alert display processor 33 installed at both sides of a vehicle front glass and alerting other vehicle's proximity to the driver in a format of text or bar such as reference numerals 320-1 and 320-2; and an alert sound generator 35 for generating an alert sound.

The lateral alert lamp processor 31 is to alert the other vehicles' drivers, the glass alert display processor 33 is to alert the driver, and the alert sound generator 35 is to alert both the driver and the other vehicles' drivers.

The alerting unit 30 can alert the driver and the other vehicles' drivers with an alert level varying based on the alert signal. For example, a blink rate can be accelerated depending on a proximity distance in such a manner that when the other vehicles approach at a distance of less than the first proximity distance setting value, a lamp blink rate is set to a level 1, and when the other vehicles approach at a distance of less than the second proximity distance setting value, the lamp blink rate is set to a level 2, and when the other vehicles approach at a distance of less than the third proximity distance setting value, the lamp blink rate is set to a level 5. Further, the glass alert display processor 33 can alert with a proximity alerting text color varying based on the alert signal. The alert sound generator 35 can alert with a magnitude of the alert sound varying depending on the alert signal.

Figure 2:
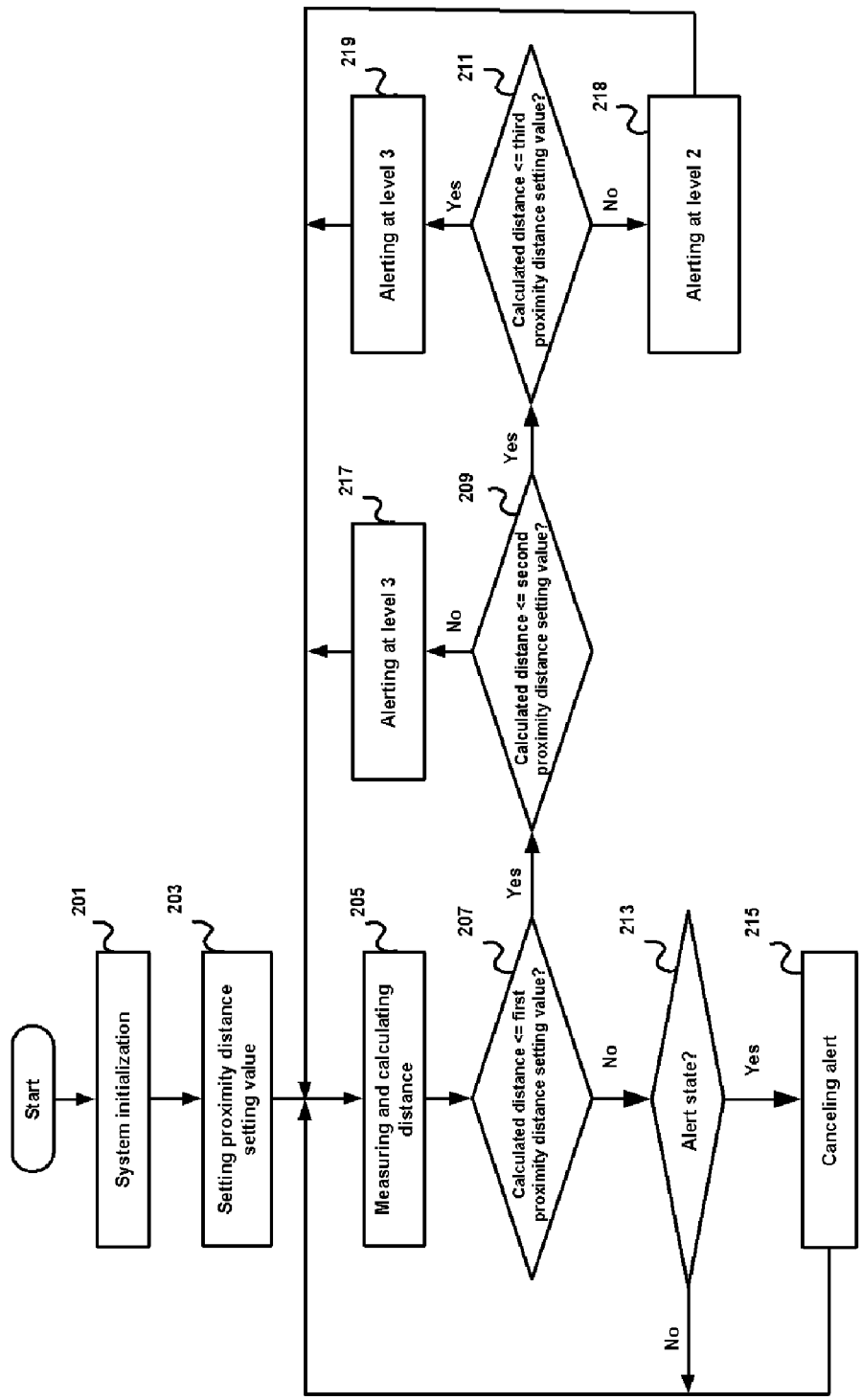
FIG. 2 is a flowchart illustrating a vehicle proximity alerting method according to an embodiment of the present invention.

FIG. 2 is a flowchart illustrating a vehicle proximity alerting method according to an embodiment of the present invention. Hereinafter, a description will be made with reference to FIGS. 1 to 4.

First, when the vehicle powers on or its engine starts, the controller 11 initializes a system in Step 201. After that, the controller 11 sets the proximity distance setting value through the key input unit (not shown) by the user in Step 203. Once the proximity distance setting value is set by the user, the step 203 is not executed until the user resets. If the user presses a key of the key input unit to reset the proximity distance setting value, the controller 11 recognizes the resetting of the proximity distance setting value and sets a subsequently inputted proximity distance setting value as a new proximity distance setting value.

Upon completion of the above Step, the controller 11 controls the input signal processor 13 to output a control signal requesting a distance measurement to the sensor unit 20 in Step 205. If so, the input signal processor 13 receives the sensing signal from the sensor unit 20, and converts each sensing signal into the distance value.

The measured distance value can be inputted to and stored in the controller 11, and can be outputted to and stored in the distance calculator 14. The input signal processor 13 outputs the measured distance value to the distance calculator 14 and concurrently, outputs a signal for informing that the measured distance value is outputted to the distance calculator 14, to the controller 11. If so, the controller 11 outputs the preset proximity distance setting value from the distance setting unit 12 to the distance calculator 14.

After that, the controller 11 sequentially compares the measured distance values with the proximity distance setting values received from the controller 11, respectively, in Steps 207, 209 and 211. If the measured distance value is determined to be less than the first proximity distance setting value in the Step 207, and is determined to be more than the second proximity distance setting value in the Step 209, the controller 11 alerts at an alert level 3 in Step 217. In other words, the alert sound is generated at a lowest level. However, if the measured distance value is determined to be less than even the second proximity distance setting value in the Step 209, it is determined that the measured distance value is less than the third proximity distance setting value in Step 211. If the measured distance value is determined to be more than the third proximity distance setting value in the Step 211, the controller 11 alerts at an alert level 2 in Step 218. In other words, the alert sound is generated at a middle level. Otherwise, the controller 11 alerts at the alert level 3 in Step 219.

After the alerting, the controller 11 continuously performs the distance measurement in the Step 205.

If it is determined that the measured distance value is more than the first proximity distance setting value in the Step 207, the controller 11 determines whether or not the vehicle is in an alert state in Step 213. In other words, it is determined whether or not the other vehicles recognize the alert state caused by their approaching within a predetermined distance, and gets out of the predetermined distance.

If it is determined that the vehicle is not in the alert state in the Step 213, the controller 11 continuously performs the distance measurement in the Step 205, and if so, the controller 11 cancels the alert in Step 215 and proceeds with the Step 205.

As described above, the present invention has an advantage in that it can alert the other vehicles' proximity to the driver and the other vehicles' drivers, thereby preventing a fender-bender or a large traffic accident, reducing the number of casualties resulting from the traffic accident, and securing a personal property.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A vehicle proximity alerting system comprising:
   a sensor device having a plurality of sensors for measuring distances from other vehicles;
   a system controlling unit for receiving measurement signals from the sensor device; calculating distance from other vehicles, sequentially comparing the calculated distance with proximity distance setting values being set by a user, and generating an alert signal according to corresponding one of the proximity distance setting values; and
   an alerting unit for receiving the alert signal and alerting the drivers of other vehicles using a lateral alert lamp display and alerting the vehicle driver using a glass display, wherein the lateral alert lamp display having a plurality of lamps at left and right sides of the vehicle, and the glass display installed at a front windshield glass of the vehicle and displaying the vehicle proximity alerting data.

2. The system according to claim 1, wherein the sensor unit comprises:
   a first distance sensor for sensing a distance from a front vehicle;
   a second distance sensor for sensing a distance from a right vehicle;
   a third distance sensor for sensing a distance from a left vehicle;
   a fourth distance sensor for sensing a distance from a rear vehicle.

3. The system according to claim 1, wherein the system controlling unit comprises:
   a distance setting unit for storing the proximity distance setting values;
   an input signal processor for receiving sensing signals from the sensors device under a predetermined control, and converting the received sensing signals into distance value;
   a distance calculator for sequentially comparing the distance values with the proximity distance setting values under a predetermined control, determining whether or not the distance value is less than the proximity distance setting values, and generating determination result signal;
   an output signal processor for generating the alert signal corresponding to one of the proximity distances setting values under a predetermined control; and
   a controller for controlling the input signal processor and the distance calculator, reading and outputting the proximity distance setting values to the distance calculator in a vehicle proximity alerting mode, and receiving and outputting the determination result signal and the alert signal to the output signal processor.

4. The system according to claim 2, wherein the system controlling unit comprises:
   a distance setting unit for storing the proximity distance setting values;
   an input signal processor for receiving sensing signal from the sensor unit under a predetermined control, and converting the received sensing signal into distance value;
   a distance calculator for sequentially comparing the distance value with the proximity distance setting values under a predetermined control, determining whether or not the distance value is less than the proximity distance setting values, and generating determination result signal;
   an output signal processor for generating the alert signal corresponding to one of the proximity distances setting values under a predetermined control; and
   a controller for controlling the input signal processor and the distance calculator, reading and outputting the proximity distance setting values to the distance calculator in a vehicle proximity alerting mode, and receiving and outputting the determination result signal and the alert signal to the output signal processor.

5. The system according to claim 1, wherein the glass alert display is an organic EL (ElectroLuminescent) display unit.

6. A vehicle proximity alerting method comprising the steps of:
   setting proximity distance setting values by a user;
   measuring distances from other vehicles using a sensor device;
   sequentially comparing the measured distance with the proximity distance setting values, and alerting the drivers of other vehicles using a lateral alert lamp display and alerting the vehicle driver using a glass display of an alerting unit, correspondingly to one of the corresponding proximity distance setting values, wherein the lateral alert lamp display having a plurality of lamps at left and right sides of the vehicle, and the glass display installed at front windshield class of the vehicle and displaying the vehicle proximity alerting data.

7. The method according to claim 6, wherein the alerting is further performed using an alert sound signal.

8. The method according to claim 6, wherein the alerting is performed through displaying a vehicle proximity alerting text data.

9. The method according to claim 6, wherein the alerting is performed through blinking a lamp installed outside a vehicle and alerting anti-approach to other vehicles.

* * * * *